United States Patent [19]

Nakamura

[11] Patent Number: 5,355,258
[45] Date of Patent: Oct. 11, 1994

[54] CIRCUIT FOR READING OUT MAGNETIC RECORD CAPABLE OF LOWERING SLICE LEVEL AND MAGNETIC RECORDER THEREWITH

[75] Inventor: Akira Nakamura, Kyoto, Japan
[73] Assignee: Rohm Co., Ltd., Kyoto, Japan
[21] Appl. No.: 29,400
[22] Filed: Mar. 10, 1993

[30] Foreign Application Priority Data

Mar. 11, 1992 [JP] Japan .................. 4-52612

[51] Int. Cl.⁵ .............................................. G11B 5/09
[52] U.S. Cl. .................................................... 360/46
[58] Field of Search ................ 360/31, 46, 53, 67, 360/45

[56] References Cited

U.S. PATENT DOCUMENTS

| | | | |
|---|---|---|---|
| 4,480,276 | 10/1984 | Batey et al. | 360/45 |
| 5,161,071 | 11/1992 | Nakamura | 360/46 |
| 5,163,003 | 11/1992 | Kimura | 360/45 |
| 5,231,544 | 7/1993 | Matsushige | 360/46 |
| 5,287,227 | 2/1994 | Cronch et al. | 360/45 |

FOREIGN PATENT DOCUMENTS 3-66004 3/1991 Japan .
4-32004 2/1992 Japan .

OTHER PUBLICATIONS

JP 04-30307 Abstract, "Peak Detection System of Magnetic Disk Device and Recording Medium Format Constitution System", Takagi, May 13, 1992.
JP 61-151456 Abstract, "Method For Testing Magnetic Disk Medium", Okada, Nov. 27, 1986.

*Primary Examiner*—Donald Hajec
*Assistant Examiner*—Won Tae C. Kim
*Attorney, Agent, or Firm*—Fish & Richardson

[57] ABSTRACT

A magnetic record readout circuit and a magnetic recording apparatus. A transistor is located at the output side of a comparator for level slice. If the level slice comparator does not output high for the predetermined time or longer, the transistor remains on. A capacitor is placed between the collector of the transistor and ground. When the transistor is off, the capacitor is charged with a current source connected to the transistor collector. When the capacitor is charged, the level slice comparator outputs high. In response to the level slice comparator which outputs high, one of full-wave rectifying circuits located at the input side of the level slice comparator forces a capacitor for peak hold of a full-wave-rectified waveform to be discharged. As the capacitor is discharged, a given slice level lowers.

14 Claims, 8 Drawing Sheets

CIRCUIT FOR READING OUT MAGNETIC RECORD CAPABLE OF LOWERING SLICE LEVEL AND MAGNETIC RECORDER THEREWITH

BACKGROUND OF THE INVENTION

1. Cross-reference to Related Applications

This application is relevant to my prior filed pending applications Japanese Patent Application Nos. Hei 2-138990 and 1-202563 filed with the Japanese Patent Office on May 28, 1990 and Aug. 3, 1989 respectively.

2. Field of the Invention

This invention relates to a readout circuit using a level slice circuit for reading out magnetic records from media such as floppy disks (FDs) and a magnetic recorder using the readout circuit.

3. Description of the Related Arts

FDs are used widely as external storage media for computers, wordprocessors, and the like. The surface of an FD is formed with a track 200 like a concentric circle, as shown in FIG. 4A, when the FD is formatted. The track 200 is divided into a preamble 202, a number of sectors 204, and a postamble 206.

Each of the sectors 204 is further divided into an ID field 208 and a data field 210 between which a gap 212 is provided. The ID field 208 is an area in which ID information is recorded when the FD is formatted. As illustrated in FIGS. 4A and 4B, the ID field 208 contains a Sync (synchronous) field 214, AM (address mark) 216, ID (identification) 218, and CRC (cyclic redundancy check code) 220. The data field 210 is an area which stores data when the FD is actually used for data storage. Thus, a write is made into the ID field 208 and the data field 210 at different points of time; therefore, the amplitude of each signal (reproduction amplitude) obtained during read cycle may become unequal to that during a write cycle because of being off track (which means that a magnetic head is out of place) or various settings.

FIGS. 4B*i* and 4B*ii* are each an example of the ID field 208 on an 8-inch FD; the former is a record example on a single density FD and the latter is a record example on a double density FD. On the single density FD, the ID field consists of a 6-byte Sync field 214, 1-byte AM 216, 4-byte ID 218, and 2-byte CRC 220, namely, the ID field length is 13 bytes. A 6-byte pattern of "00" is recorded in the Sync field 214 and one byte of "FE" in the AM 216. On the double density FD, the ID field consists of a 12-byte Sync field 214, 4-byte AM 216, 4-byte ID 218, and 2-byte CRC 220, namely, the ID field length is 22 bytes. A 12-byte pattern of "00" is recorded in the Sync field 214 and a 3-byte pattern of "A1" and one byte of "FE" in the AM 216.

Reading out information from an FD requires an FD readout circuit containing a magnetic head. Information or data is recorded on an FD by magnetizing the surface of the FD. A magnetic head is used to detect magnetization for signal output. A readout circuit is required to process the signals obtained through the magnetic head for providing necessary information.

FIG. 5 shows a block diagram of a readout circuit according to a first conventional example and FIG. 6 shows the operation of the readout circuit. The circuit shown in FIG. 5 has a magnetic head 12 for reading out information recorded as horizontal magnetization 100 on the surface of an FD 10 (FIG. 6A). The magnetic head 12 is connected to a preamplifier 14 which amplifies signals obtained through the magnetic head 12. The preamplifier 14 is followed by a low-pass filter (LPF) 16 which extracts low-frequency components from the output of the preamplifier 14. A signal 102 obtained through the LPF 16 becomes a signal having a peak when the direction of the horizontal magnetization 100 is reversed (FIG. 6B).

The LPF 16 is followed by a differentiator 18, followed by a comparator 20, followed by a time domain filter 22, followed by a pulse shaper 24. The differentiator differentiates the signal 102 for outputting a signal 104. Therefore, the signal 104 crosses zero when the magnetization 100 is reversed (FIG. 6C). The comparator 20 detects this zero crossing and outputs a square wave signal 106 which makes the high-to-low or low-to-high transition at each zero cross point (FIG. 6D). The pulse shaper 24 takes the signal via the time domain filter 22 and detects a rising or falling edge of the square wave signal 106 for outputting a pulse signal 108 (FIG. 6E).

The time domain filter 22 is a filter adapted to filter the signal 106 in a time domain for removing the effect of saddles. A saddle is a peak caused by approach to zero of the signal 104 provided by the differentiator in an area where magnetization is constant; it causes a waveform like a spike to be generated on the signal 106. The time domain filter 22 is a digital filter adapted to remove the spike-like waveform; it is a circuit generally used in FD readout circuits.

The first conventional example circuit contains a problem of a small saddle margin, namely, it cannot remove the effect of extremely large saddle. To solve such a problem, the applicant has proposed FD readout circuits having a level slice circuit as described in Japanese Patent Application Nos. Hei 2-138990 and 1-202563.

FIGS. 7 and 8 show block diagrams of circuits according to a second conventional example and FIG. 9 shows the operation of the readout circuit. This example readout circuit has a similar configuration to those previously proposed. The configuration of the conventional readout circuit has a feature of a given improvement made to a level slice circuit used in a hard disk readout circuit with a comparatively constant readout amplitude so that the level slice circuit can be applied to an FD readout circuit with a larger fluctuation in the readout amplitude than the hard disk readout circuit.

As shown in FIG. 7, the conventional readout circuit is provided with a level slice circuit 26 and a delay circuit 28 in place of the time domain filter 22 shown in FIG. 5. The level slice circuit 26 includes full-wave rectifying circuits 30 and 32 each of which full-wave-rectifies the LPF16 output, as shown in FIG. 8. The output terminal of the full-wave rectifying circuit 30 is connected via a smoothing capacitor 34 to the positive (+) input terminal of a comparator 36 and the output terminal of the full-wave rectifying circuit 32 is connected to the negative (−) input terminal of the comparator 36. The output terminal of the comparator 36 is connected to the delay circuit 28.

In the conventional example, when a signal 142 (FIG. 9A) is supplied from the LPF 16 to a differentiator 18 and the level slice circuit 26, the full-wave rectifying circuits 30 and 32 of the level slice circuit 26 full-wave-rectify the signal. The full-wave-rectified waveform output by the full-wave rectifying circuit 32 is fed into the comparator 36. On the other hand, the full-wave-rectified waveform output by the full-wave rectifying circuit 30 is smoothed through the smoothing capacitor 34 and then fed into the comparator 36. The comparator 36 compares the full-wave-rectification value from the full-wave rectifying circuit 32 with the smooth value and slices the former level with the latter level as a slice level. A square wave signal, which goes high when the full-wave-rectification value exceeds the slice level and goes low when the value falls below the level, is supplied to the delay circuit 28 which then delays the square wave signal by the delay time which is equal to Δt of the differentiator 18. The resultant signal (window waveform) 146 is as shown in FIG. 9B.

Signal 144 output by the differentiator 18 takes a waveform (FIG. 9C) as shown in the first conventional example (FIG. 6C). The comparator 20 detects the zero-cross points of the signal 144, only when the signal 146 is high, as zero-cross points related to a change in magnetization 100 (low level mask), and generates a signal 148 not affected by saddles, as shown in FIG. 9D. The pulse shaper 24 detects edges of the signal 148 (FIG. 9E) and outputs read data 152 (FIG. 9F).

Thus, according to the configuration shown in FIG. 7 previously proposed by the applicant, there is provided a readout circuit with a large saddle margin, which is applicable to high-density FDs of 4 MB, etc.

However, the previously proposed configuration is easily affected by a rapid amplitude change although it has a large saddle margin. Since information is recorded in ID and data fields on an FD at different points of time, the reproduction amplitudes may differ because of being off track, etc., as described above. Since full-wave-rectified waveforms are smoothed to determine the slice level in the previously proposed configuration, it is hard to follow up the rapid drop in reproduction amplitude; just after the amplitude drops, so-called data missing is prone to occur in read data. Such missing data is undesirable particularly for appropriate reading of a Sync field.

SUMMARY OF THE INVENTION

Accordingly, it is an object of the invention to provide a magnetic record readout circuit which has a large saddle margin and can follow up the rapid drop in reproduction amplitude for reduction of missing data.

Another object of the invention is to provide a magnetic recorder using the magnetic record readout circuit.

To these ends, according to the invention, there is provided a magnetic record readout circuit which comprises:
  a) differentiation means for differentiating a signal output from a magnetic head;
  b) means for comparing the differentiation result with a zero value to detect a zero cross of the differentiation result, an output signal of the means being a square wave signal whose value is inverted in response to detection of the zero cross;
  c) detector means for detecting an edge of the square wave signal and outputting a pulse signal upon detection of the edge; and
  d) level slice means which comprises:
    d(1) full-wave rectification means for full-wave-rectifying the signal output from the magnetic head;
    d(2) slice level determination means responsive to the full-wave-rectified waveform for determining a slice level;
    d(3) comparison means for comparing the full-wave-rectified waveform with the slice level and outputting the comparison result as a pulse signal; and
    d(4) slice level lowering means for lowering the slice level if the full-wave-rectified waveform does not exceed the slice level for the predetermined time or longer.

In the readout circuit of the invention, if the full-wave-rectified waveform does not exceed the slice level for the predetermined time or longer, the slice level is lowered so that the rapid drop in reproduction amplitude, if it occurs, can be followed up for reducing data missing and providing a large saddle margin.

The slice level determination means may comprise a slice level determining capacitor charged in response to a peak voltage of the full-wave-rectified waveform and means for dividing the peak voltage for determining a slice level. The slice level lowering means may comprise means for forcing the slice level determining capacitor to be discharged if the full-wave-rectified waveform does not exceed the slice level for the predetermined time or longer.

The following is available as a method for discharging the slice level determining capacitor: First, a capacitor for determining the discharge timing is provided. If the comparison means outputs the comparison result less than a predetermined value, the discharge timing determining capacitor is charged and the voltage across the capacitor is compared with a predetermined reference value for determining the discharge timing. The slice level determining capacitor is forced to be discharged at the determined discharge timing. The discharge timing determining capacitor charge means may comprise a switching element which is turned on when the comparison means outputs the comparison result less than the predetermined value and a current source for charging the discharge timing determining capacitor when the switching element is on.

The readout circuit of the invention may further comprise low-pass filter means for low-pass-filtering a signal output from the magnetic head, then feeding the resultant signal into the differentiation means and the full-wave rectification means or may further comprise preamplification means for amplifying a signal output from the magnetic head, then feeding the resultant signal into the differentiation means and the full-wave rectification means. Magnetic recording media are, for example, floppy disks.

The readout circuit of the invention can also be combined with a magnetic head to provide a magnetic recording apparatus.

DESCRIPTION OF THE PREFERRED EMBODIMENT

Figure 1:
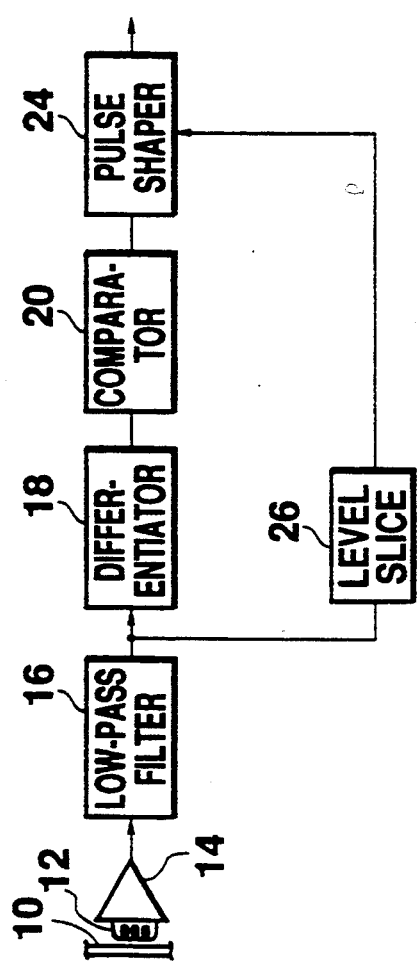
FIG. 1 is a block diagram showing the configuration of an FD readout circuit according to one embodiment of the invention.

Referring now to the accompanying drawings, there is shown a preferred embodiment of the present invention. The similar parts to those shown in FIGS. 4 to 9 are designated by the same reference numerals in FIGS. 1 to 3, and their description is omitted.

Figure 2:
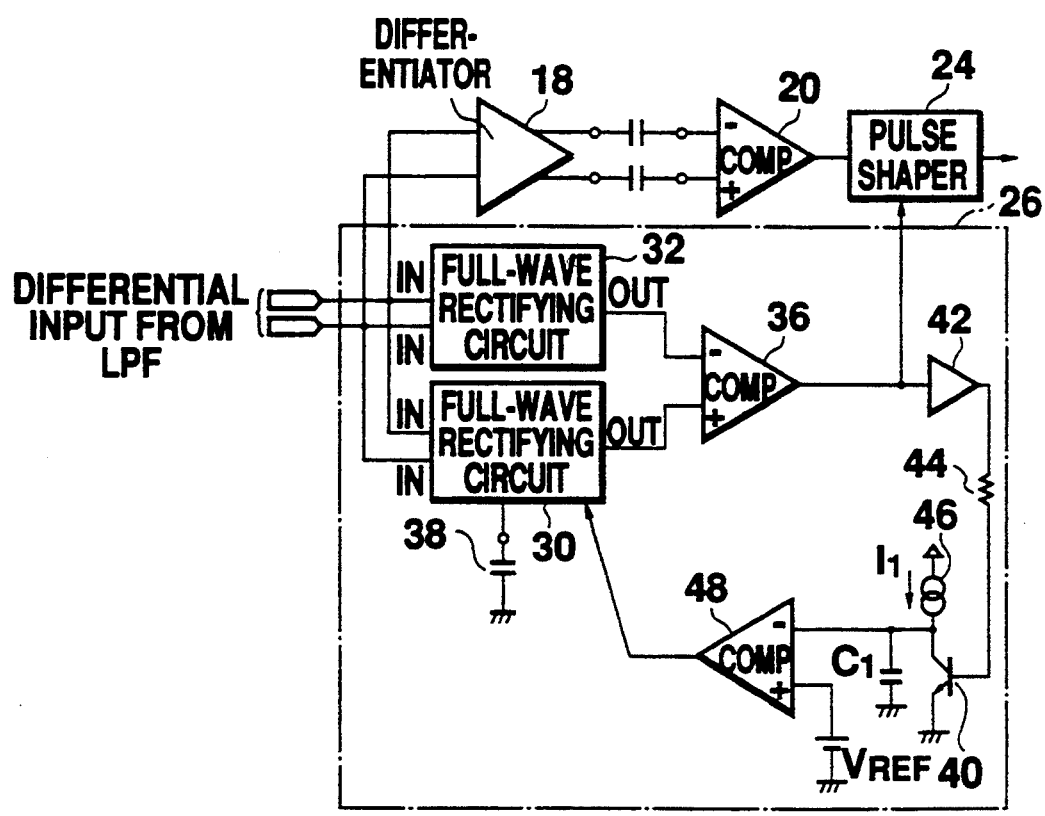
FIG. 2 is a block diagram showing the configuration of a level slice circuit in the embodiment.

FIG. 1 shows the configuration of an FD readout circuit according to one embodiment of the invention. FIG. 2 shows the configuration of a level slice circuit 26 which is the main feature of the readout circuit. As shown in the figures, the embodiment is an improvement on the previously proposed configuration.

As shown in FIG. 2, the level slice circuit 26 in the embodiment comprises the following: Full-wave rectifying circuits 30 and 32 which full-wave-rectify differential input from an LPF16, the full-wave rectifying circuit 30 dividing a peak voltage of a full-wave-rectified waveform for outputting a slice level; a peak hold capacitor 38 for the full-wave rectifying circuit 30 to determine the slice level in response to the voltage across the capacitor 38 (peak voltage of full-wave-rectified waveform); and a comparator 36, placed following the full-wave rectifying circuits 30 and 32, whose output is fed into a pulse shaper 24 for use as a window waveform when an edge of comparator 20 output is detected, the comparator 36 operating like the comparator 36 shown in FIG. 8.

The level slice circuit 26 of the embodiment further includes a grounded-emitter transistor 40. Output of the comparator 36 is fed into the base of the transistor 40 via a buffer 42 and a resistor 44. On the other hand, a current source 46 is connected to the collector of the transistor 40 and a capacitor $C_1$ is connected between the collector and emitter of the transistor.

The level slice circuit 26 includes a comparator 48. The collector of the transistor 40 is connected to the negative (−) input terminal of the comparator 48, while reference power source $V_{REF}$ is connected to the positive (+) input terminal. Output of the comparator 48 is fed into the full-wave rectifying circuit 30; when the comparator 48 output takes a predetermined value, the capacitor 38 is forced to discharge.

Figure 3:
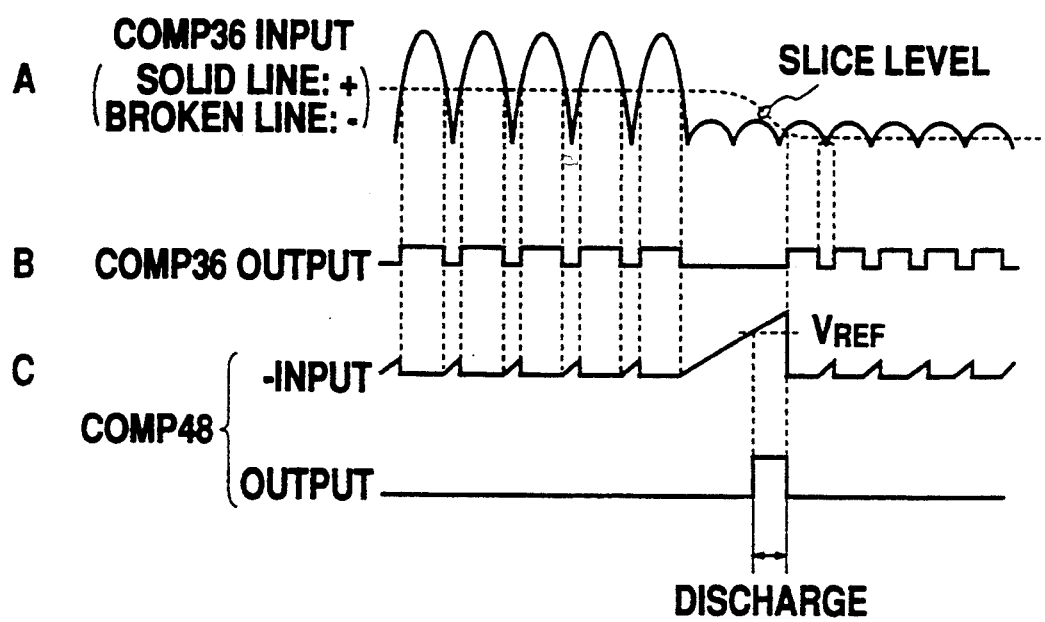
FIG. 3 shows the operation of the level slice circuit in the embodiment shown in FIG. 2, wherein A shows input of the comparator 36, B shows output of the comparator 36, and C shows input and output of the comparator 48.
Figure 4A:
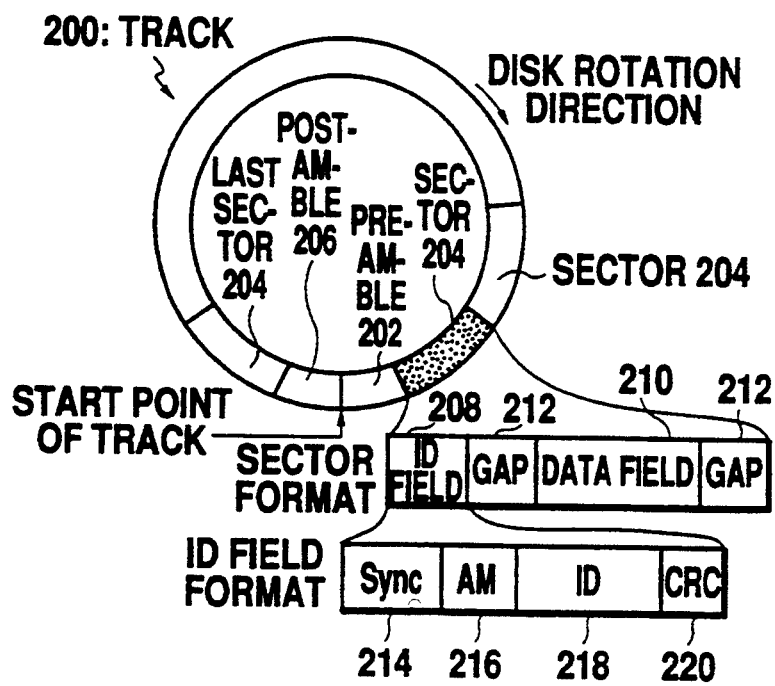
FIG. 4A shows a sector format example on an FD.
Figure 4B:
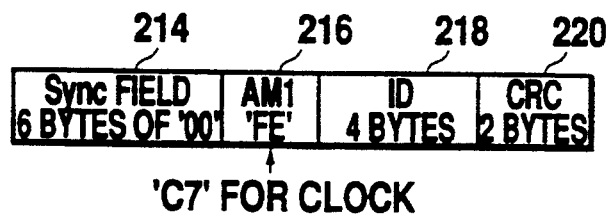
FIGS. 4B and 4C show ID field format examples on an FD.
Figure 4C:
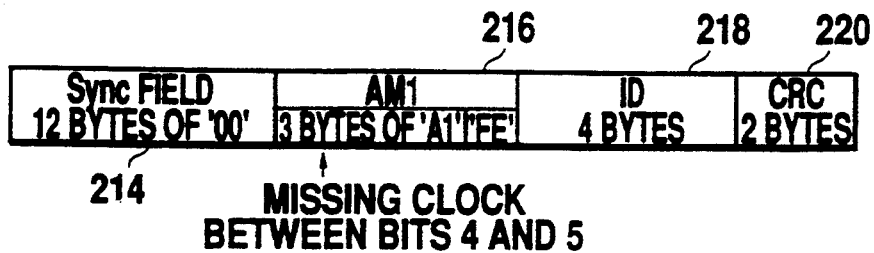
Figure 5:
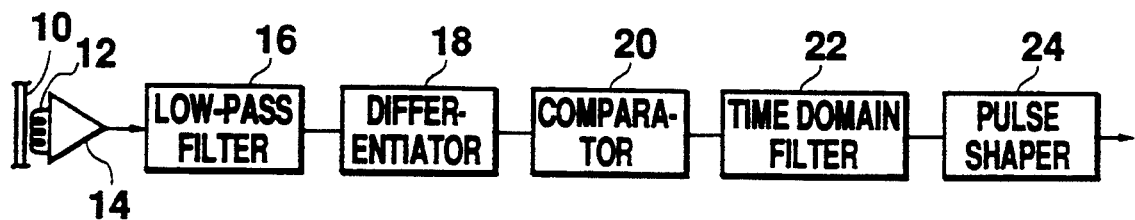
FIG. 5 is a block diagram showing the configuration of a conventional circuit having a time domain filter.
Figure 6:
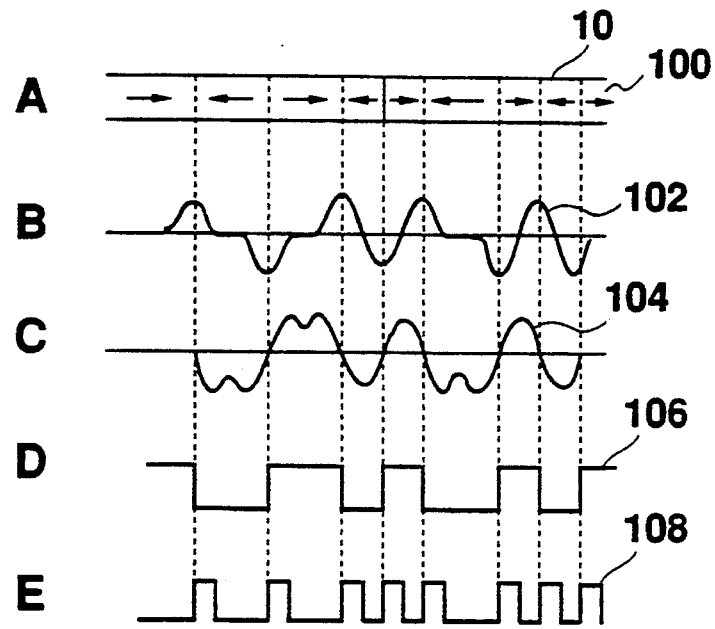
FIG. 6 shows the operation of the conventional circuit shown in FIG. 5; wherein A shows the recording form on an FD, B shows the output of the LPF, C shows the output of the differentiator, D shows the output of the comparator 20, and E shows the output of the pulse shaper.
Figure 7:
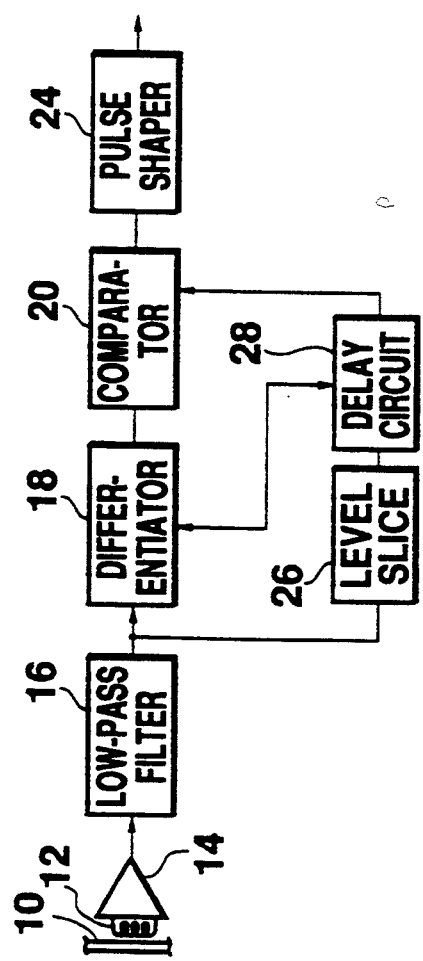
FIG. 7 is a block diagram showing the configuration of a conventional circuit having a level slice circuit.
Figure 8:
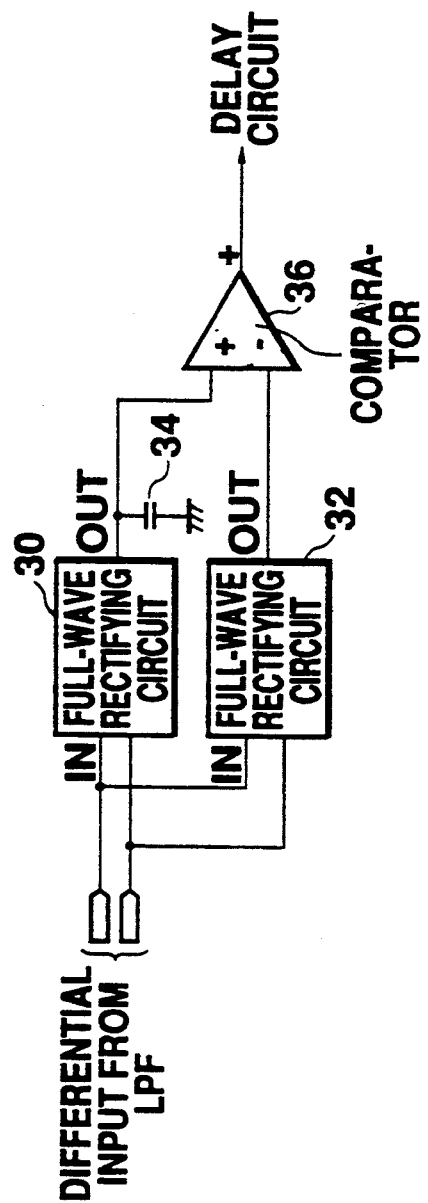
FIG. 8 is a block diagram showing the configuration of the level slice circuit in the conventional circuit.
Figure 9:
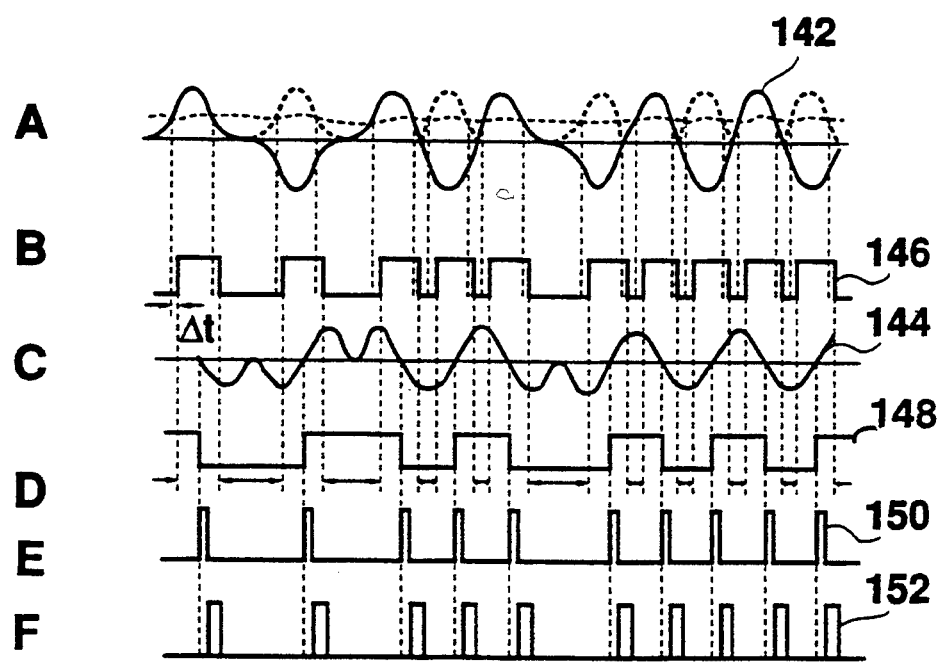
FIG. 9 shows the operation of the conventional circuit shown in FIG. 7, wherein A shows the output of the LPF, B shows the output of the delay circuit, C shows the output of the differentiator, D shows the output of the comparator 20, E shows the edge detection results on the comparator 20 output, and F shows the read data.

FIG. 3 shows the operation of the level slice circuit 26 in the embodiment. The operation of the readout circuit according to the embodiment is substantially the same as that of the readout circuit previously proposed except for the level slice circuit 26. Then, the operation of the level slice circuit 26 is mainly described.

A reproduced signal is input from a magnetic head 12 via a preamplifier 14 and the LPF 16 to the full-wave rectifying circuits 30 and 32. Then, the waveform of the resultant signal (full-wave-rectified waveform) becomes as shown in FIG. 3A. The full-wave rectifying circuit 30 uses the capacitor 38 to peak-hold the full-wave-rectified waveform and divide the peak hold value for determining a slice level.

When the reproduction amplitudes are constant (namely, the peak voltages of the full-wave-rectified waveform are constant), the slice level denoted by the broken line in FIG. 3 is also constant. Thus, output of the comparator 36 becomes like the waveform 146 in FIG. 9B, as shown in the first half of FIG. 3B.

While the output of the comparator 36 remains low, the base potential lowers, thus the transistor 40 is turned off and the capacitor $C_1$ is charged with an electric current from the current source 46. Then, the input voltage to the negative (−) input terminal of the comparator 48 rises gradually.

When the output of the comparator 36 goes high, the base potential rises, thus the transistor 40 is turned on and an electric current from the current source 46 and a discharged current of the capacitor $C_1$ flow into GND via the transistor 40. Therefore, the input voltage to the negative (−) input terminal of the comparator 48 reaches 0.

In the embodiment, the input voltage to the negative (−) input terminal of the comparator 48 is set so as not to exceed $V_{REF}$ as long as the full-wave-rectified waveform of a predetermined period is provided with a given amplitude. Therefore, output of the comparator 48 goes low.

If the peak voltage of the full-wave-rectified waveform falls below the slice level as a result of the drop in reproduction amplitude, no square wave appears at the output terminal of the comparator 36. In such a case, the base potential of the transistor 40 remains low and the capacitor $C_1$ is charged with an electric current from the current source 46. When the voltage across the capacitor $C_1$ exceeds $V_{REF}$, the output of the comparator 48 goes high.

In response to the comparator 48 output going high, the full-wave rectifying circuit 30 discharges the capacitor 38. In response to the discharge of the capacitor 38, the slice level determined by dividing the peak hold value by the full-wave rectifying circuit 30 lowers as shown in the right-hand half of FIG. 3A. Then, the full-wave-rectified waveform is taken at a certain point of time and a square wave again appears at the output terminal of the comparator 36.

According to the embodiment, if the peak voltage of the full-wave-rectified waveform lowers, the peak hold capacitor 38 is forced to be discharged so that the slice level is lowered, thus missing data, when the reproduction amplitude lowers rapidly, is suppressed and dummy data need not be entered in the beginning of an ID field or data field. A saddle margin is also secured.

Current value $I_1$ of the current source 46 may be switched in response to the density of an FD 10 (1M, 2M, or 4M). $V_{REF}$ may also be changed, so that the time until the voltage across the capacitor $C_1$ reaches $V_{REF}$ can be changed in response to the FD 10 density. The peak hold capacitor 38 may be discharged by turning on/off a switch connected in parallel to the capacitor 38 in response to output of the comparator 48.

As described above, according to the invention, if the peak voltage of the full-wave-rectified waveform lowers, the slice level is lowered, thus data missing caused by the rapid drop in reproduction amplitude can be prevented or suppressed and a large saddle margin can be provided for a level slice circuit and an FD readout circuit.

What is claimed is:

1. A magnetic record readout circuit comprising:
   a) differentiation means for differentiating a signal output from a magnetic head;
   b) means for comparing the differentiated signal with a value to detect a zero cross of the differentiated signal, an output signal of said means for comparing being a square wave signal whose value is inverted in response to detection of a zero cross;
   c) means for detecting an edge of said square wave signal and for outputting a pulse signal upon detection of the edge; and
   d) level slice means comprising:
   e) full-wave rectification means for full-wave-rectifying the signal output from said magnetic head;
   f) slice level determination means responsive to the full-wave-rectified waveform for determining a slice level;
   g) comparison means for comparing said full-wave-rectified waveform with said slice level and for outputting a result of said comparing as a pulse signal; and
   h) slice level lowering means for lowering said slice level based on said pulse signal,
       wherein said slice level is lowered when said pulse signal indicates that said full-wave-rectified waveform is below said slice level for at least a predetermined time.

2. The magnetic record readout circuit as claimed in claim 1 further comprising low-pass filter means for low-pass-filtering the signal output from said magnetic head, then feeding the resultant signal into said differentiation means and said full-wave rectification means.

3. The magnetic record readout circuit as claimed in claim 1 further comprising preamplification means for amplifying the signal output from said magnetic head, then feeding the resultant signal into said differentiation means and said full-wave rectification means.

4. The magnetic record readout circuit as claimed in claim 1 wherein a magnetic recording medium is a floppy disk.

5. The magnetic record readout circuit as claimed in claim 1 wherein said slice level determination means comprises:
   a slice level determining capacitor charged in response to a peak voltage of said full-wave-rectified waveform; and
   means for dividing the peak voltage for determining a slice level; and
   wherein said slice level lowering means comprises means for forcing said slice level determining capacitor to be discharged when said pulse signal indicates that said full-wave-rectified waveform is below said slice level for at least the predetermined time.

6. The magnetic record readout circuit as claimed in claim 5 wherein said slice level lowering means further comprises:
   a further capacitor;
   means for charging said further capacitor if said comparison means outputs the comparison result which is less than a predetermined value; and
   means for comparing a voltage across said further capacitor with a predetermined reference value, in order to determine the discharge timing;
   said forcible discharge means forcing said slice level determining capacitor to be discharged at the determined discharge timing.

7. The magnetic record readout circuit as claimed in claim 6 wherein said further capacitor charge means comprises:
   a switching element placed at a stage following said comparison means, said element being turned on if said means for comparing outputs a comparison result which is less than a predetermined value; and
   a current source for charging said further capacitor when said switching element is on.

8. A magnetic recording apparatus comprising:
   a) a magnetic head for reading information magnetically recorded on a magnetic recording medium and outputting a signal; and
   b) a magnetic record readout circuit for applying a predetermined treatment to said signal output from said magnetic head for outputting a pulse signal, said readout circuit comprising:
   c) differentiation means for differentiating said signal output from said magnetic head;
   d) means for comparing the differentiation result with a zero value to detect a zero cross of the differentiation result, an output signal of said means being a square wave signal whose value is inverted in response to detection of the zero cross;
   e) means for detecting an edge of the square wave signal and outputting a pulse signal upon detection of the edge; and
   f) level slice means comprising: full-wave rectification means for
   g) full-wave-rectifying said signal output from said magnetic head;
   h) slice level determination means responsive to the full-wave-rectified waveform for determining a slice level;
   i) comparison means for comparing said full-wave-rectified waveform with said slice level and outputting the comparison result as a pulse signal; and
   j) slice level lowering means for lowering said slice level based on said pulse signal,
       wherein said slice level is lowered when said pulse signal indicates that said full-wave-rectified waveform is below said slice level for at least a predetermined time.

9. The magnetic recording apparatus as claimed in claim 8, said readout circuit further comprising low-pass filter means for low-pass-filtering said signal output from said magnetic head, then feeding the resultant signal into said differentiation means and said full-wave rectification means.

10. The magnetic recording apparatus as claimed in claim 8, said readout circuit further comprising preamplification means for amplifying said signal output from said magnetic head, then feeding the resultant signal into said differentiation means and said full-wave rectification means.

11. The magnetic recording apparatus as claimed in claim 8 wherein said magnetic recording medium is a floppy disk.

12. The magnetic recording apparatus as claimed in claim 8 wherein said slice level determination means comprises:

a slice level determining capacitor charged in response to a peak voltage of said full-wave-rectified waveform; and means for dividing the peak voltage for determining a slice level; and wherein said slice level lowering means comprises means for forcing said slice level determining capacitor to be discharged when said pulse signal indicates that said full-wave-rectified waveform is below said slice level for at least the predetermined time.

13. The magnetic recording apparatus as claimed in claim 12 wherein said slice level lowering means further comprises:

a further capacitor;

means for charging said further capacitor if said comparison means outputs the comparison result which is less than a predetermined value; and means for comparing a voltage across said further capacitor with a predetermined reference value, in order to determine the discharge timing;

said forcible discharge means forcing said slice level determining capacitor to be discharged at the determined discharge timing.

14. The magnetic recording apparatus as claimed in claim 13 wherein said further capacitor charge means comprises:

a switching element placed at a stage following said comparison means, said element being turned on if said means for comparing outputs a comparison result which is less than a predetermined value; and a current source for charging said further capacitor when said switching element is on.

* * * * *